United States Patent [19]

Kimata et al.

[11] 4,195,814

[45] Apr. 1, 1980

[54] CONTINUOUSLY OPERABLE FUEL INJECTION DEVICE

[75] Inventors: Kei Kimata, Ama; Yoshinobu Yasuda, Iwata; Ikuo Kinashi, Iwata; Yoshihiro Matsumoto, Iwata; Saburo Ohshima, Iwata, all of Japan

[73] Assignee: NTN Toyo Bearing Company, Limited, Osaka, Japan

[21] Appl. No.: 919,925

[22] Filed: Jun. 28, 1978

[30] Foreign Application Priority Data

Jun. 28, 1977 [JP] Japan ............................ 52-85797[U]

[51] Int. Cl.[2] .............................................. F16K 1/52

[52] U.S. Cl. ................................ 251/205; 137/625.3; 137/88

[58] Field of Search ..................... 251/205; 137/625.3, 137/88

[56] References Cited

U.S. PATENT DOCUMENTS

| | | | |
|---|---|---|---|
| 878,077 | 2/1908 | Longuemare | 137/625.3 X |
| 951,267 | 3/1910 | Cator | 251/205 |
| 1,010,184 | 11/1911 | Schulz | 251/205 X |
| 2,642,254 | 6/1953 | Armstrong | 137/625.3 X |

*Primary Examiner*—William R. Cline

*Attorney, Agent, or Firm*—Armstrong, Nikaido, Marmelstein & Kubovcik

[57] ABSTRACT

A continuously operable fuel injection device comprises a sleeve having a substantially triangular measuring window communicating with the outlet port of a main body, the sleeve being inserted in the cavity of the main body, and a control spool having an annular groove communicating with the inlet port of the main body through an axially extending hole and axially slidably inserted in the sleeve, the substantially triangular measuring window cooperating with the annular groove of the control sleeve to form a variable orifice. By axially sliding the control spool, any desired flow rate can be obtained.

2 Claims, 7 Drawing Figures

CONTINUOUSLY OPERABLE FUEL INJECTION DEVICE

BACKGROUND OF THE INVENTION (a) Field of the Invention

The present invention relates to a continuously operable fuel flow rate measuring device, and more particularly it relates to a continuously operable fuel flow rate measuring device of type comprising a variable orifice adapted to be controlled in connection with the total amount of air being drawn into an internal combustion engine, and a pressure regulator adapted to maintain the pressure difference across said variable orifice at a predetermined value.

(b) Description of the Prior Art

An arrangement has been known which comprises a single distributor, a plurality of variable orifices adapted to be simultaneously adjusted and optionally operable to determine the amount of fuel being supplied to a plurality of injectors, and a control valve for maintaining the pressure difference across each of said variable orifices at as constant a value as possible, the area of opening of each variable orifice being linearly variable with the axial displacement of the control spool.

In this connection, it is required that the area of opening of said orifice vary with the amount of air being drawn into the internal combustion engine. For advantageous positioning in the engine room and in order to attain an accurate control action, it is desired that the air flowmeter for measuring the suction air flow rate be connected directly to the above-mentioned control spool.

SUMMARY OF THE INVENTION

The present invention provides a construction comprising a sleeve having a substantially triangular measuring window communicating with the outlet port of a main body, said sleeve being inserted in the cavity of said main body, and a control spool having an annular groove communicating with the inlet port of said main body through an axially extending through hole and axially slidably inserted in said sleeve, said substantially triangular measuring window cooperating with said annular groove of said control sleeve to form a variable orifice. As a result of this construction, by axially sliding the control spool, any desired fuel rate can be easily obtained.

According to the invention, the end face of the control spool is resiliently pressed against a control rod adapted to transmit the displacement of a flow rate detecting valve disposed in a suction air passage to attain a direct correspondence between the degree of opening of the variable orifice and the axial position of the flow rate detecting valve. As a result, the amount of communication between the annular groove of the control spool and the triangular window of the sleeve will vary with the axial position of the flow rate detecting valve, i.e., with the amount of suction air, whereby the air-fuel ratio can be accurately maintained.

Because of the construction of the invention as described above, there is provided a fuel injection device which can be advantageously positioned in the engine room and which is high in the accuracy of flow rate measurement.

DESCRIPTION OF THE PREFERRED EMBODIMENTS

Figure 1:
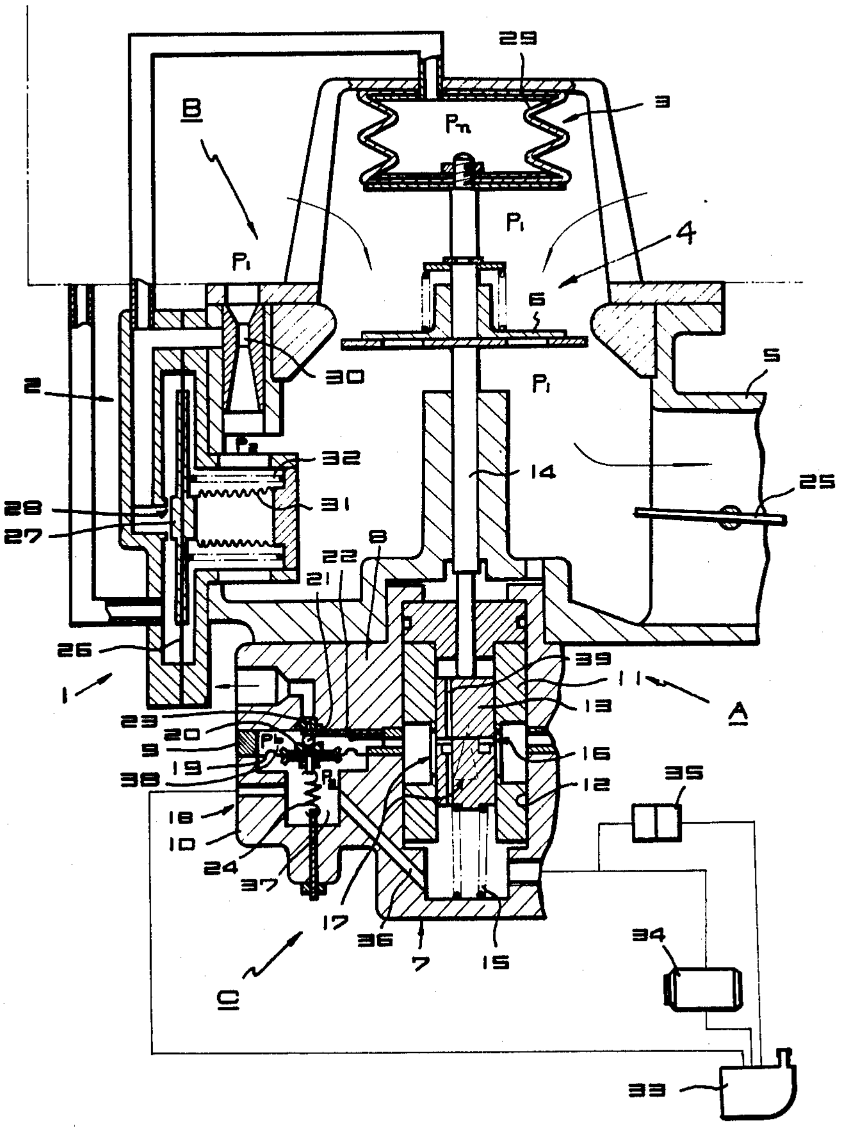
FIG. 1 is a schematic view of a continuously operable fuel injection device according to the present invention.
Figure 2:
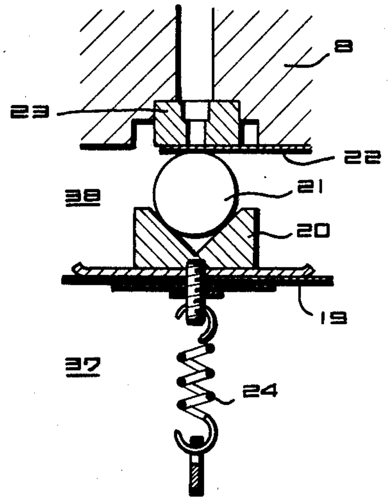
FIG. 2 is a schematic view of the internal arrangement of a pressure control unit.
Figure 3:
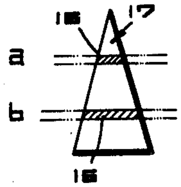
FIG. 3 is a schematic view of variable orifice.

In the drawings, A designates a fuel injection device; B designates a suction air flow rate measuring mechanism for measuring the flow rate of air being drawn into an internal conbustion engine; and C designates a fuel measuring and distributing mechanism for measuring and distributing fuel.

In the suction air flow rate measuring mechanism B, the numeral 1 designates a servo-mechanism utilizing a fluid, comprising a servo-valve 2 and an actuator 3 disposed in an air cleaner; and 4 designates a measuring mechanism for maintaining the pressure difference $(P_1-P_2)$ across a flow rate detecting valve 6 disposed in a suction passage 5 at a constant value by means of said servo-mechanism and measuring the suction air flow rate from the area of opening of the flow rate detecting valve 6. In the fuel meauring and distributing mechanism C, the numeral 7 designates a main body comprising an upper member 8, an intermediate member 9 and a lower member 10; 11 designates a sleeve disposed in a hole 12 formed in the main body at the center thereof; 13 designates a control spool disposed in the sleeve 11 so that it is axially displaceable by a control rod 14 which transmits the displacement of said flow rate detecting valve 6; 15 designates a spring which presses the control spool 13; 16 designates an annular groove formed in the outer periphery of the control spool 13; 17 designates substantally triangular windows formed in the sleeve 11; and 18 designates a pressure control unit. The pressure control unit comprises a diaphragm 19 clamped between the intermediate member 9 and the lower member 10, a valve seat 20 fixed to said diaphragm 19, a ball 21 seated in said valve seat 20, a springy reed 22 clamped between the upper member 8 and the intermediate member 9, a valve barrel 23 inserted in the upper member 8, and a spring 24 pulling the diaphragm 19 downwardly as seen in FIG. 1.

Figure 5:
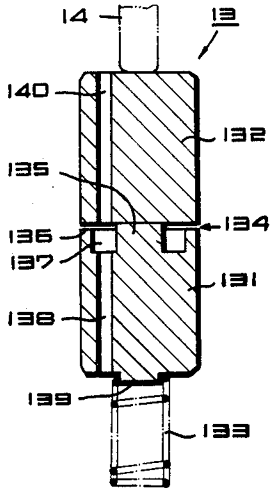
FIGS. 5 through 7 are sectional views showing different forms of the construction of a control spool.

The construction of the control spool 13 is as shown in FIG. 5. Thus, the control spool 13 comprises two independently produced spools 131 and 132 which are urged against each other by a spring 133 to define an annular slit 134 between the spools 131 and 132. One spool 131 comprises a central projection 135, a lowered peripheral edge 136, a peripheral groove 137, one or a plurality of axial through holes for feeding fuel to the peripheral groove 137, and a spring seat 139 formed on the other end. The other spool 132 has one or a plurality of axial through holes 140. The spring 133 serves to urge said spools 131 and 132 against the control rod 14 in such a condition that the spools are put together end to end. Because of the construction described above, the annular slit 134 formed around the entire periphery encircling the butted surfaces of the spools 131 and 132 is determined by the level difference between the central projection 135 and the peripheral edge 136. In addition, the central projection, the lowered peripheral edge and the peripheral groove in the spool 131 may be provided in the other spool 132 instead of in the spool 131. As for the axial through holes 138 and 140 provided in the spools, it is sufficient to provide them in only one of the spools if communication passages are provided in the outer periphery of the spool.

Figure 6:
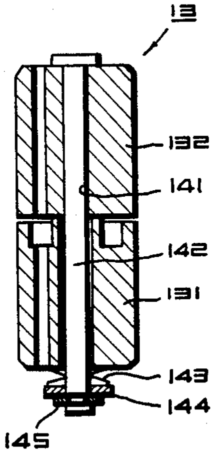

FIG. 6 shows another embodiment of the control spool 13. According to this embodiment, separate spools 131 and 132 are axially centrally formed with a through hole 141 and the two spools are axially adjustably connected together by a shaft 142 loosely inserted in one or both of the spools, springs 143 and stop rings 144 and 145. When the spools are assembled into the sleeve having the triangular windows, the alignment between the two spools is effected by the inner surface of the sleeve.

Figure 7:
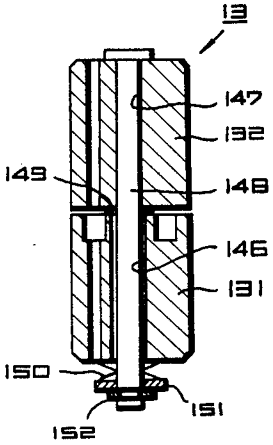

FIG. 7 shows a further modification of the control spool 13, wherein none of the separate spools 131 and 132 are formed with a central projection. The spools are provided with through holes 146 and 147 and are axially adjustably connected together by a shaft 148 loosely inserted in one or both of the spools 131 and 132, a shim 149 which provides a desired slit width, springs 150 and stop rings 151 and 152. When the spools are assembled into the sleeve having the triangular windows, the alignment between the two spools is effected by the inner surface of the sleeve.

With the control spool constructions described above, the production of the separate spools does not require any special machining process for cutting the annular slit, because it is only necessary to provide a difference in level between the central projection and the peripheral edge in order to define such annular slit. Therefore, the machining operation is easy and high machining precision can be easily attained. Further, in the control spool of FIG. 7 which does not require the central projection, it is only necessary to prepare a shim of required thickness.

This device operates as follows.

When a throttle valve 23 is manipulated, the pressure difference ($P_1-P_2$) across the flow rate detecting valve 6 will deviate. This pressure change will be detected as a displacement of the pressure difference setting diaphragm 26 of the servo-valve 2, said displacement bringing about a corresponding change in the area of opening 28 of the variable orifice 27. Eventually, the pressure $P_n$ ($P'_2<P_n<P_1$) in the bellows 29 of the actuator 3 will change, causing the flow rate detecting valve 6 to be further opened or closed until the pressure difference ($P_1-P_2$) resumes its predetermined value. In addition, the numeral 30 designates a venturi serving to provide a negative pressure source for the servo-mechanism 1.

The above refers to a case where it is desired to make the amount of suction air proprtional to the volume rate of flow. However, when it is desired to make it proportional to the weight rate of flow, a density compensation bellows 31 will be provided so that it can be interlocked to said pressure difference setting diaphragm 26. The effective area of the bellows 31 is selected so that it is equal to the expression (the effective area of the pressure difference setting diaphragm 26)×(the pressure difference at the reference temperature and pressure)÷(the pressure of a reference gas enclosed in the bellows 31). The bellows 31 is installed in parallel to the pressure difference setting spring 32 and takes a share in setting the pressure difference.

When the flow rate detecting valve 6 is opened and closed in proportion to the amount of suction air, the control spool 13 interlocked to the flow rate detecting valve 6 is also displaced within the sleeve 11. Therefore, the amount of communication between the annular groove 16 of the control spool 13 and the triangular windows 17 of the sleeve 11 changes with the amount of suction air and hence the intended air-fuel ratio is maintained accurately.

The fuel is pumped from a fuel tank 33 into the main body 34 by a fuel pump 34 while it is maintained at a predetermined pressure by a pressure regulator 35, part of the fuel being led through a hole 36 and into the lower chamber 37 of the pressure control unit 18, from which it is fed back to the tank 33. The rest is led through the metering gate 16, 17 and into the upper chamber 38 of the pressure control unit 18, from which it is passed through the reed valve 21, 22, 23 to the associated fuel injector (not shown) attached to the air suction pipe. The reed valve 21, 22, 23 so acts that the fuel pressure Pb in the upper chamber 38 will have a fixed value set by the pressure Pa in the lower chamber 37 plus the pressure exerted by the tension spring 24. Consequently, the pressure drop (Pa−Pb) across the fuel metering gate 16, 17 is maintained at a fixed value, so that the amount of communication of the fuel metering gate 16, 17 is proportional to the rate of flow of fuel. In addition, the fuel is also acting on the upper surface of the spool 13 through the through hole 39 of the spool 13.

In the drawings, a single pressure control unit 18 has been shown installed to the fuel measuring and distributing mechanism. It is to be noted, however, that the same number of such pressure control units as the number of cylinders of the engine are disposed around the fuel measuring and distributing mechanism. The annular groove 16 and triangular windows 17 may be replaced by the slit type provided that the area of opening of the orifice is proportional to the amount of suction air.

Figure 4:
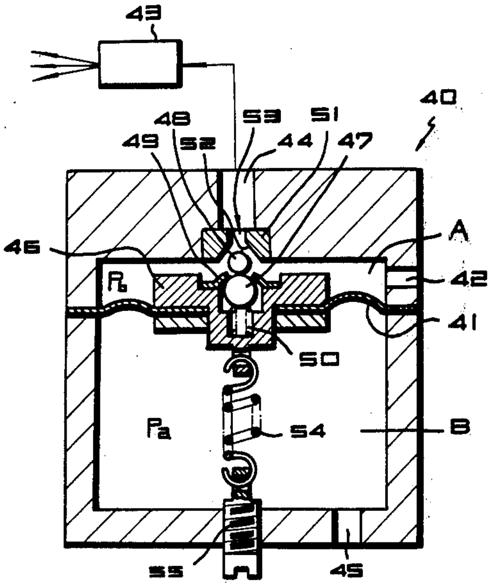
FIG. 4 a schematic view of another embodiment of a pressure control unit.

FIG. 4 shows another embodiment of a pressure regulator. This pressure regulator 40 has two chambers A and B separated from each other by a diaphragm 41. The chamber A is provided with a communication hole 42 communicating with the outlet port of the flow rate measuring device, and a communication hole 44 communicating with an injector 43, the discharge pressure being Pb. The chamber B is provided with a communication hole 45 communicating with the lower chamber underneath the control spool of the flow rate measuring device, a supply pressure Pa being exerted therein. A reinforcing plate 46 is attached to the diaphragm 41. In the chamber A on one side of the reinforcing plate 46, a valve ball 48 made integral with a large articular ball 47 as by welding is rotatably installed as held by a presser member 49 and is subjected to the influence of an energy storing spring 50. The numeral 51 designates a valve seat disposed in the communication hole 44 and having a conical surface 52, said valve seat cooperating with the valve ball 48 to form a passage 53 for fuel. In the chamber B on the other side of the reinforcing plate 46, a pressure difference setting spring (which is a tension spring) 54 is installed through the intermediary of an adjusting screw 55, the force of said spring serving to set the pressure difference (Pa−Pb) between the chambers A and B. The function of said pressure regulator is the same as that of the pressure regulator shown in FIG. 1 and hence a description thereof is omitted.

The present invention is not limited to the embodiments described above and may of course be modified into various forms without departing from the true scope and spirit of the invention.

What is claimed is:

1. A continuously operable fuel injection device comprising a sleeve having a substantially triangular metering window communicating with the outlet port of a main body, said sleeve being inserted in the cavity of said main body, and a control spool having an annular groove communicating with the inlet port of said main body through an axially extending through hole, said control spool being axially slidably inserted in said sleeve, said substantially triangular metering window of said sleeve cooperating with the annular groove of the control spool to form a variable orifice, the end face of said control spool resiliently pressed against a control rod adapted to transmit the displacement of a flow rate detecting valve disposed in a suction air passage, whereby a direct correspondence between the degree of opening of the variable orifice and the axial position of the flow rate detecting valve is assured.

2. A continuously operable fuel injection device as set forth in claim 1, characterized in that the control spool inserted in the sleeve having the substantially triangular metering window comprises two spools each having an end face at right angles with its axis, said spools being put together end to end to define a uniform slit around the periphery encircling the butted ends of said spools.

* * * * *